Sept. 17, 1968  R. J. S. BROWN ET AL  3,402,344
NUCLEAR MAGNETISM WELL LOGGING METHOD AND APPARATUS
Filed Aug. 2, 1965  7 Sheets-Sheet 1
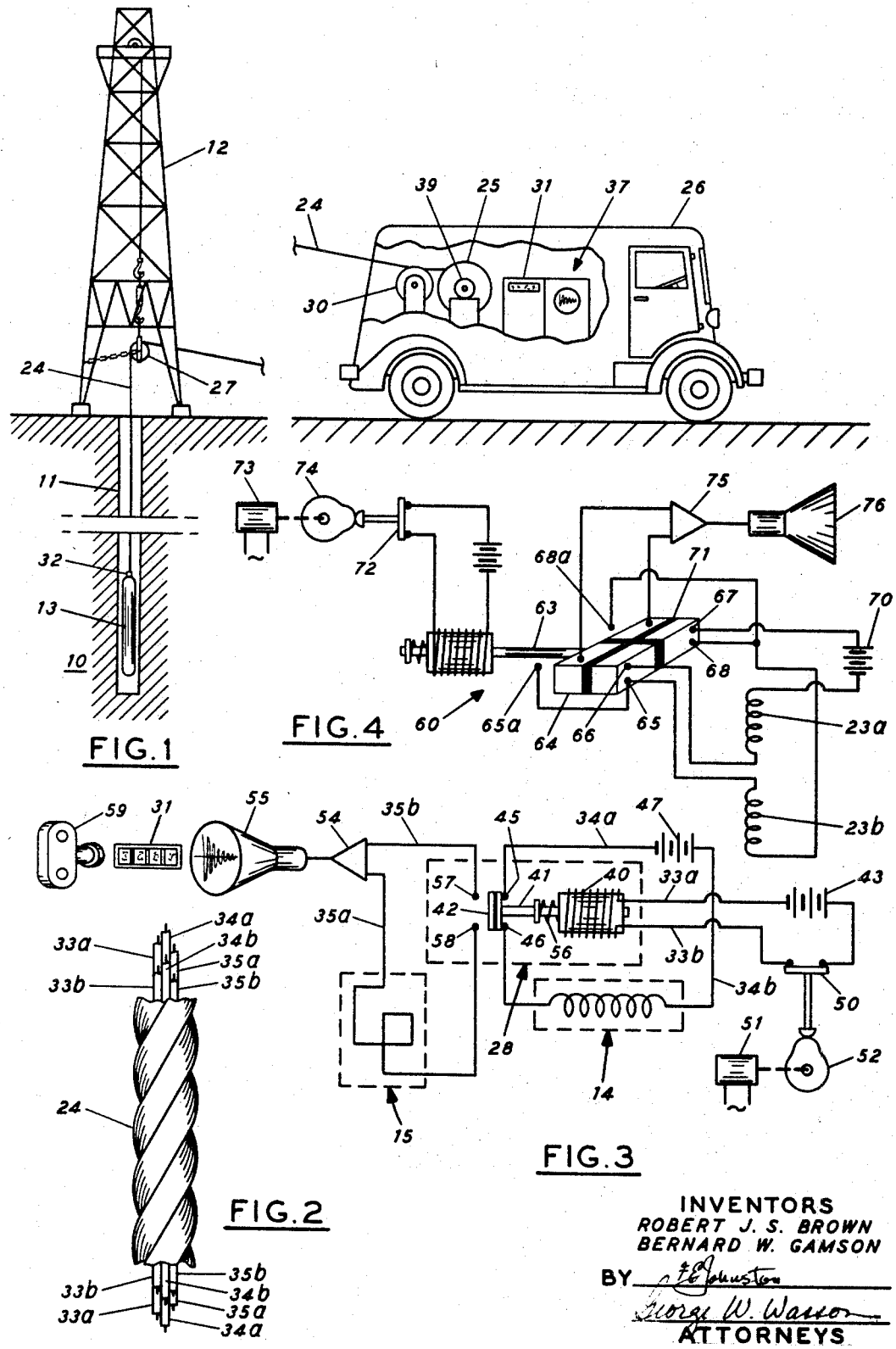
INVENTORS
ROBERT J. S. BROWN
BERNARD W. GAMSON
BY
ATTORNEYS

INVENTORS
ROBERT J. S. BROWN
BERNARD W. GAMSON

BY
ATTORNEYS

INVENTORS
ROBERT J. S. BROWN
BERNARD W. GAMSON

BY
ATTORNEYS

Sept. 17, 1968　　　　R. J. S. BROWN ET AL　　　　3,402,344
NUCLEAR MAGNETISM WELL LOGGING METHOD AND APPARATUS
Filed Aug. 2, 1965　　　　　　　　　　　　　　　7 Sheets-Sheet 4

INVENTORS
ROBERT J. S. BROWN
BERNARD W. GAMSON
BY
ATTORNEYS

United States Patent Office 3,402,344
Patented Sept. 17, 1968

3,402,344
NUCLEAR MAGNETISM WELL LOGGING
METHOD AND APPARATUS
Robert J. S. Brown, Fullerton, and Bernard W. Gamson,
Los Angeles, Calif., assignors, by direct and mesne assignments, to Chevron Research Company, San Francisco, Calif., a corporation of Delaware
Continuation-in-part of application Ser. No. 387,569,
Aug. 5, 1964. This application Aug. 2, 1965, Ser.
No. 477,666
8 Claims. (Cl. 324—.5)

This application is a continuation-in-part of application Ser. No. 387,569, filed Aug. 5, 1964, now abandoned.

This invention relates to nuclear magnetism well logging and more particularly to a method and apparatus for detecting nuclear magnetic signals from fluids in and around a well bore penetrating an earth formation.

In detecting fluid in earth formations using nuclear magnetism well logging techniques, a logging sonde travels through a well bore penetrating formations having a strong likelihood of oil deposits. As the well is traversed, the sonde generates and detects nuclear magnetic signals from fluids such as water and hydrocarbons in and around the well bore. In establishing nuclear magnetic signals, the protons of the hydrogen atoms of the fluids are first aligned in a strong polarizing field and then permitted to relax toward alignment with a second field, usually the earth's magnetic field. In the process of relaxing, the protons act as small gyroscopes and precess about the direction of the second field. The precession of the protons establishes a rotating magnetic field detectable by a receiving coil generating a signal that may then be transmitted to a recording device at the surface of the earth. Relaxation of the protons is expressed in time and is measured from a characteristic of the signal transmitted to the recording device.

However, operators are often apprehensive about using logging equipment in deep wells especially where the wells penetrate incompetent formations such as caving sands or sloughing shales. This is because of the inordinately long period of time required to log each well, and the fear that the well might become susceptible to caving or sloughing during logging. It is therefore desirable to provide well logging equipment and methods that increase operational reliability through a reduction in the time required to log each well commensurate with obtaining accurate logging data.

The principal factor in determining the length of time required to log a well by nuclear magnetism logging techniques is the time required for polarizing the protons of the formation fluids before each nuclear magnetic signal observation. If there is a possibility that the signals have a long relaxation time, say four seconds the polarizing field must be applied for about the same length of time. It is common practice in many prospecting areas to polarize the protons for times of the order of four seconds and in some locations, if the relaxation times are longer, likewise even longer polarizing times are desirable.

With some prior art logging operation, the only way to assure adequate polarization of formation fluids before each nuclear magnetic signal observation, was to stop the logging sonde during polarization of the formation fluids and the subsequent period of signal detection. It should be apparent that such an operation is not consistent with the desire for speed and certainly not possible when moving linearly along the well bore during logging at a constant rate of speed. Consequently as the sonde is drawn through the well bore, a portion of the polarizing coil most advanced in the direction of travel is always opposite a new portion of the formation that has not been subjected to the polarizing field for a full desirable polarizing time. Thus, if the polarizing coil is also used as the receiving coil, as is common practice, the inphase precession signal of the formation fluids within the new portion is weaker than it might be if the formation had been subjected to the polarizing field for the full desirable polarizing time. In this application the term "full desirable polarizing time" means the particular polarizing interval of the system and is usually of a magnitude at least equal to the relaxation time of the protons of the hydrogen atoms of the formation fluids.

When long relaxation times are present, say, greater than about 4 seconds, the loss in signal amplitude is sufficient to require correction of the data. Relogging the well at a different polarizing time to obtain a relaxation curve, provides a basis for correction but is time consuming and expensive. By the term "complete relaxation curve" is meant a plot showing the dependence of the free precession signal on the polarizing time, for at least several polarizing times. Also, when the formation being logged contains intermixed fluids such as water and oil, correction of logging data on the basis of a polarizing curve may not be sufficient.

It is a particular object of the present invention to provide a novel apparatus and method for generating and detecting nuclear magnetic signals from formation fluids having relatively long relaxation times and in which the accuracy of a nuclear magnetism log derived from such signals may be maintained while the logging sonde is drawn through the well bore at an improved rate of speed.

In accordance with the invention, during logging of an earth formation by nuclear magnetism well logging techniques, the protons of formation fluids are exposed to a polarizing field for the full desirable polarizing time by forming a rectangular polarizing coil of elongated windings defining a vertical extension beyond the receiving coil in the direction of travel of the nuclear magnetism well logging sonde. As the polarizing coil is energized, a magnetic field is generated in the earth formation adjacent to the extension whereby fluids of the formation are polarized a full desirable polarizing time before the receiving coil arrives at a position to detect the inphase precession of the formation protons. In a preferred form of the apparatus of the present invention, the length of the extension of the polarizing coil for polarizing the formation fluids is at least $$VT_0$$

where V is the velocity of the sonde in traversing the well bore in feet per second, and $T_0$ is the polarizing time of the formation in seconds.

In accordance with the preferred method of carrying out the present invention, separate polarizing and receiving coils are provided to traverse the well bore penetrating the earth formation at a velocity proportional to the length of a vertical extension of the polarizing coil extending beyond the receiving coil in the direction of travel of the nuclear magnetism sonde. Thus protons of formation fluids adjacent to the projection are polarized for a full desirable polarizing time before arrival of the receiving coil, and in that manner the inphase precession signals derived from the precessing protons are more reliable and more easily interpreted.

Other objects, features, and advantages of the present invention will become more apparent from the following detailed description with reference now being had to the accompanying drawings in which:

FIGURE 1 is a schematic representation of an earth formation penetrated by a well bore and illustrates a nuclear magnetism logging sonde incorporating the method and apparatus of the present invention;

FIGURE 2 is an enlarged side elevation partially cut away of a portion of the cable supporting the logging sonde of FIGURE 1;

FIGURE 3 is a diagrammatic illustration of an electric circuit useful with the logging system of FIGURE 1;

FIGURE 4 is a diagram of an alternative circuit for the logging system;

Figure 6:
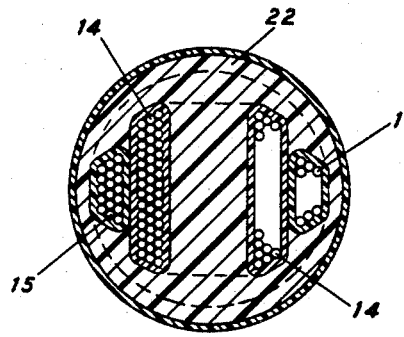
FIGURE 6 is a transverse section taken along line 6—6 of FIGURE 5.
Figure 8:
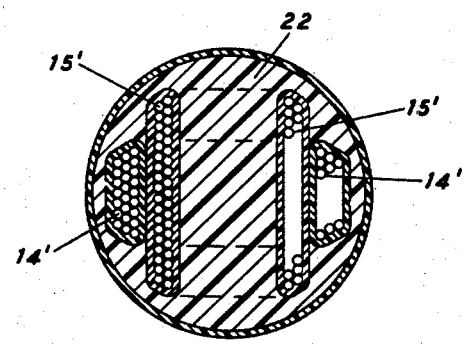
Figure 5:
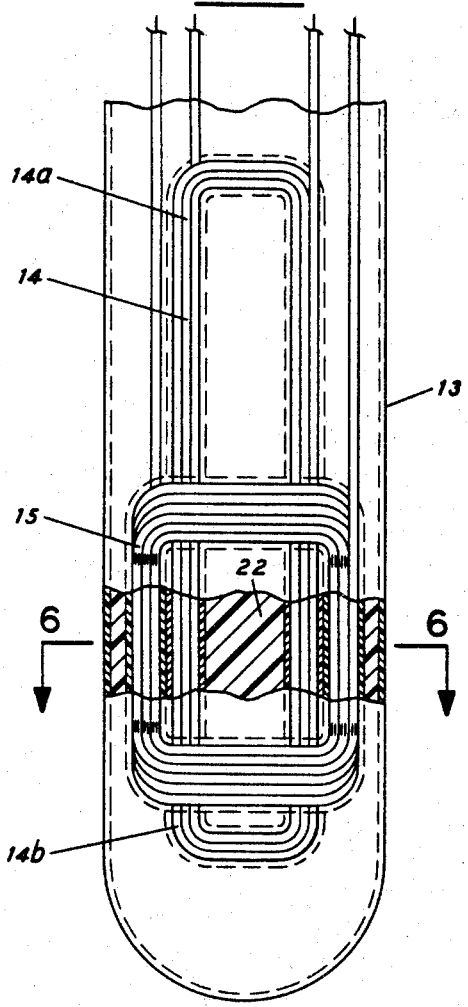
FIGURE 5 is a side elevation of the well logging sonde of FIGURE 1 partially broken away to illustrate the location of polarizing and receiving coils useful in nuclear magnetism well logging.
Figure 7:
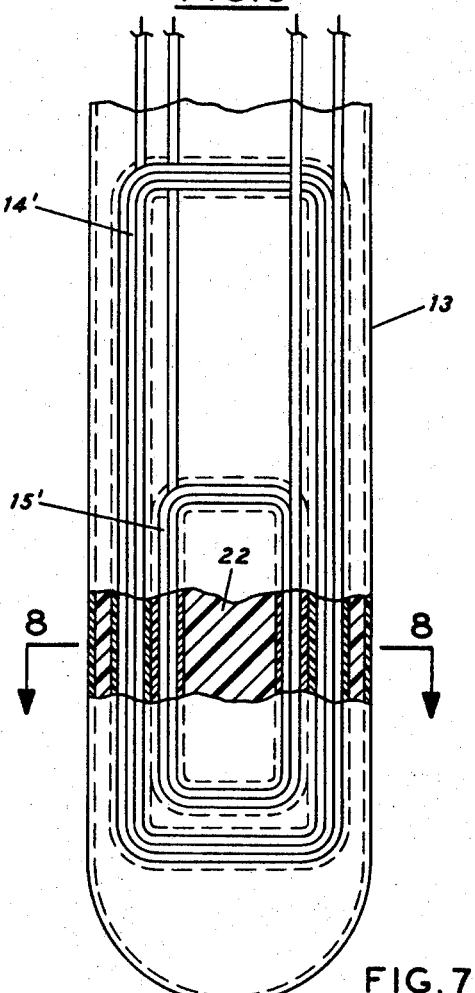

FIGURES 7 through 12 illustrate alternate configurations of receiving and polarizing coils of FIGURES 5 and 6 useful in nuclear magnetism well logging; and FIGURES 13–16 illustrate time-based plots of the relative positions of alternatively constructed logging sondes within a well to illustrate the operation of logging records by nuclear magnetism logging tools in accordance with the present invention.

In FIGURE 1 there is shown one form of the apparatus for performing nuclear magnetism measurements within an earth formation 10. The earth formation 10 is illustrated as penetrated by a well bore 11 coaxial of well derrick 12. Well bore 11 contains the liquid phase of either oil or water and is illustrated as having uniform dimensions.

In performance of the method, a nonmagnetic logging sonde 13 containing a polarizing coil 14 and a receiving coil 15, see FIGURE 5, is lowered through the well bore to a position adjacent the lowest stratum of the earth formation, and then is caused to ascend at a uniform velocity as nuclear magnetic signals are derived from formation fluids in and around the well bore.

The travel of the sonde is controlled by means of cable 24 attached to cable drum 25 located on the bed of hoist truck 26 through derrick sheave 27 and cable-measuring sheave 30. The cable-measuring sheave 30 also includes a depth indicator mechanism 31 connected thereto to indicate digitally the depth of the sonde during both downward and upward travel. Opposite to the drum 25, the cable 24 attaches to lug 32 located at the upper portion of the sonde. The cable includes three sets of conductors 33a and 33b, 34a and 34b, and 35a and 35b, see FIGURE 2, connecting the receiving and polarizing coils to recording and control equipment generally indicated at 37 within hoist truck 26. Control of these coils in a downhole position is achieved through an electrically actuated switch—discussed in detail below—housed in the upper portion of the sonde. The switch is connected to the recording equipment 37 through the conductors of cable 24.

The upward travel of the sonde is controlled by variable-speed motor 39 attached to the shaft of the drum. As the sonde ascends, the polarizing and receiving coils within the sonde are made periodically operative within the sonde.

As illustrated in FIGURE 3, the solenoid-operated switch 28 within sonde 13 is employed to control energization of the polarizing coil 14. The switch 28 includes solenoid windings 40, plunger 41 and insulated contact carrier 42 and, when energized by battery 43 through conductors 33a and 33 and switch 50, operates to position the contact carrier 42 in engagement with contacts 45 and 46. Contacts 45 and 46 in combination with contact carrier 42 form a closed loop through polarizing coil 14 and battery 47 by way of conductors 34a and 34b, and in that manner, allow current to flow through coil 14 to establish a magnetic field within the earth formation for the alignment of protons of formation fluids. The duration of polarization is controlled by motor-operated switch 50.

Switch 50 is opened in response to rotation of timing motor 51 and cam 52 and disconnects windings 40 from the battery 43. Since switches 28 and 50 are directly connected from an operations standpoint, when switch 50 opens switch 28 also opens disconnecting polarizing coil 14 from battery 47. When switch 28 is deenergized, a tension spring 56 located between the housing of windings 40 and contact carrier 42 positions the contact carrier 42 into contact with contacts 57 and 58 to establish a recording circuit including receiving coil 15, amplifier 54, oscilloscope 55 and conductors 35a and 35b. The recording circuit may also include a preamplifier interconnecting the amplifier 54 and receiving coil 15 to improve the signal-to-noise ratio of the detected signal. Oscilloscope 55 may be either an electrical gun type oscilloscope as shown, or an oscillograph for producing a permanent record of its energization. If the gun type of oscilloscope is used, the electrical signal may be recorded photographically as by camera 59 positioned to record both the depth measurement of indicator 31 and the waveform of the electrical signal displayed on the face of the oscilloscope.

To accomplish precession, the protons must be initially polarized to align the protons with the polarizing field. To assure maximum numbers of protons have been initially polarized, the rectangular polarizing coil is preferably formed with elongated windings having the longer side of each turn aligned with the axis of the logging sonde and parallel to the side wall of the well bore. However, if the polarizing coil is also used as the receiving coil as is common practice or is formed of a similar configuration located within the polarizing coil, a portion of the polarizing coil will always be moved away from the formation that it has polarized as it is being moved through the well bore. A receiving coil of common alignment will also be moved away from the polarized formation. Consequently, as explained above, the inphase signals of the formation fluids within the new portion can be expected to be weaker than maximum and may require additional corrections before data processing and analysis is complete. It has been found that by employing the method and apparatus of the present invention, adequate polarization of protons of formation fluids is accomplished during the polarization period and that the signals due to precession are more fully detected by employing polarizing and receiving coils of independently operated windings. With the polarizing coil formed so as to define a vertical extension beyond the receiving coil in the direction of travel of the logging sonde the nuclear magnetic precession signals may be observed and subsequently recorded with the assurance that the protons inducing such signals have been polarized for the full desirable polarizing time.

As shown in FIGURES 5 and 6, polarizing coil 14 is formed with an upper extension 14a extending beyond receiving coil 15 in the direction of travel of the sonde for the purpose of polarizing protons in the earth formation above the receiving coil during the upward travel of the sonde. The length of the extension is desirably selected so that the velocity of ascent of the sonde relates thereto in accordance with $VT_0$ where V is the velocity of the sonde in feet per second and $T_0$ is the polarizing time of the formation fluids in seconds. However it is understood that the length of the extension may be somewhat greater than given by the above product. The present invention requires only that the protons in the formation of fluids be adequately polarized before the arrival of the receiving coil, and hence the coil length is limited only by the power available at the hoist truck and ease of handling of the coil in its up-hole and down-hole positions.

Polarizing coil 14 includes a lower extension 14b concentrically located within receiving coil 15 and integrally connected to the upper portion of the extension 14a. The lower extension 14b and the upper extension 14a together consist of a single strand of insulated conducting wire common in the art formed into a series of windings having rectangular turns. Each turn of the coil, as shown, is supported in snug contact with adjacent turns to form a bundle. The long sides of the turns are disposed within the sonde substantially parallel with and adjacent to the side wall of the well bore. Thus, the magnetic axis of the coil is normal to the axis of the logging sonde, but parallel to the magnetic axis of the receiving coil 15. (Inasmuch as the long sides closest to the formation determine the length and strength of the magnetic field produced in the formation, these sides are referred to as the effective portions of the polarizing coil).

Receiving coil 15 located about lower projection 14b comprises a series of windings also formed of a single strand of insulated conductor similar to the conductor of the polarizing coil. The strand is wound into a coil configuration having substantially rectangular windings in which the longer side of each turn is parallel to the long side of the polarizing coil. Thus if current is passed through the coil, a magnetic axis would be established normal to the axis of the well bore. Inasmuch as the long sides of the turns parallel to the long side of the polarizing coil and closest to the side wall of the well bore are a factor determining the sensitivity of the receiving coil, these sides are often referred to as the effective portions of the receiving coil. The short sides of each turn, as shown, define parallel planes normal to the axis of the sonde but, connect to the long sides along arcuate paths located on individually opposed sides of receiving coil 15 as shown in FIGURE 6. The turns of the coil 15 may be encased in a separate shroud 21 as shown, but it should be noted that other ways of supporting the coils suitable in the art may also be used without departing from the scope of the invention.

The polarizing and receiving coils are enclosed within cylindrical block 22 formed of a nonmagnetic molding material having physical characteristics compatible with the needs of nuclear magnetism well logging. The block 22, polarizing coil 14 and receiving coil 15 are preassembled prior to supporting them within the sonde. Preassembly consists of winding and supporting the coils in predetermined relationship, and then forming block 22 about the coils by molding techniques. It is understood that many materials may be used to mold the block, but in order to be used in nuclear magnetism well logging, there is a requirement that the material has no magnetizable constituents. In this regard it has been found that epoxy-resin materials are satisfactory.

It should be understood that the receiving and polarizing coils may take a number of different configurations for the purpose of forming a vertical extension to polarize protons in the earth formation before arrival of the receiving coil. For example, in FIGURES 7 and 8, the receiving coil 15' may be disposed within the polarizing coil 14' with the effective portions of each rectangular turn of the receiving coil closest to the formation; i.e., the long sides, being parallel to the effective portions of each turn of the polarizing coil. The magnetic axis of the coils remains parallel to each other, however, and normal to the axis of symmetry of the well bore. In this arrangement the distance between the receiving coil 15' and the earth formation is slightly increased over that of the arrangemnt shown in FIGURES 5 and 6. But, the spacing between side wall of the well bore and polarizing coil is reduced resulting in an increase of the fraction of the energy of the coil penetrating the earth formation since the strength of the magnetic field decreases approximately with the square of the distance from the coil.

Figure 10:
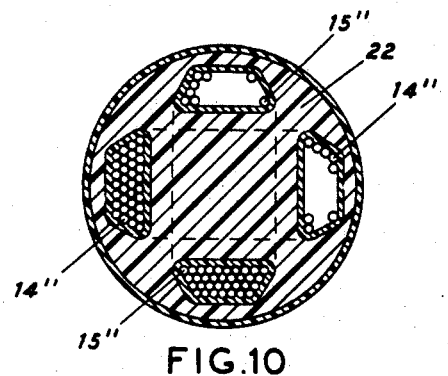
Figure 9:
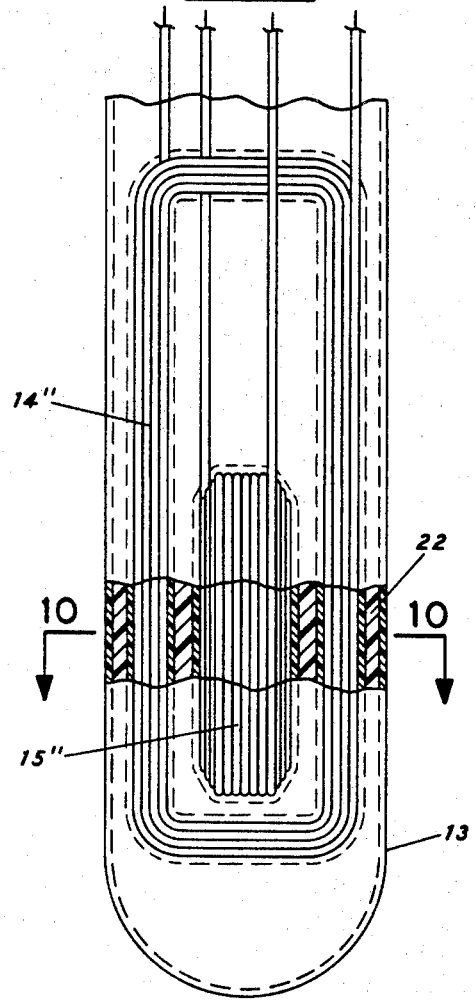

The sensitivity of the receiving coil after current has terminated in the polarizing coil, likewise varies approximately in accordance with the square of the distance separating the precessing protons and the receiving coil. In FIGURES 9 and 10 there is shown a polarizing and receiving coil configuration in which both coils are immediately adjacent the earth formation for maximizing both polarizing magnetic field penetration and receiving coil sensitivity.

In the figures, polarizing and receiving coils 14" and 15" are mounted so as to be perpendicular to each other. Thus, although the effective portions of the turns of these coils are still parallel their magnetic axes are 90 degrees apart. Hence, cross-coupling between the coils during operation of either coil is reduced.

Figure 12:
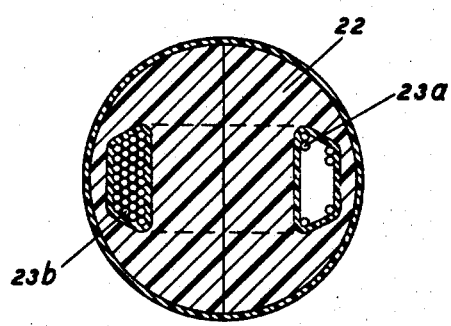
Figure 11:
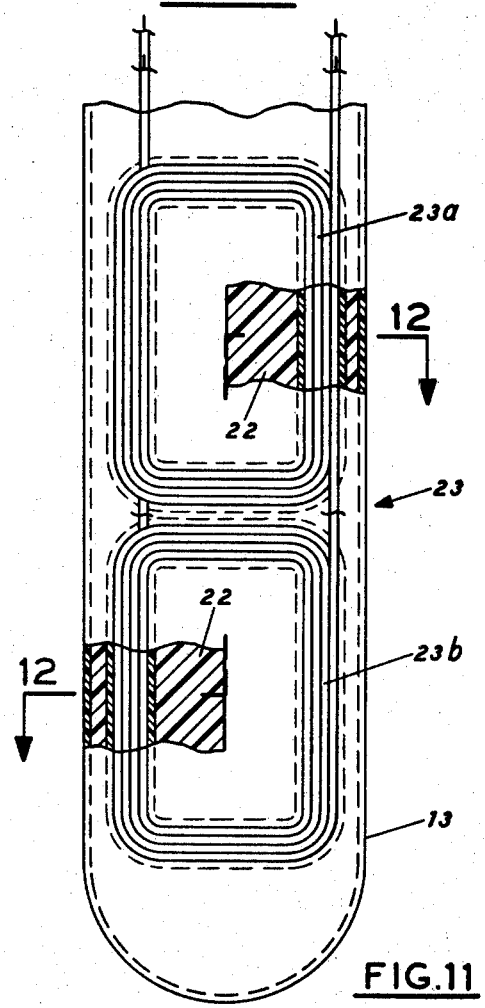

In FIGURES 11 and 12 there is shown another modification of the receiving and polarizing coils generally indicated at 23. In this modification two coils 23a and 23b connect one above the other, and are energized by means of circuitry shown in FIGURE 4. In operation, when switch 60 of FIGURE 4 is energized, plunger 63 including contact carrier 64 travels into contact with and closes contacts 65 and 66 thereby connecting upper coil 23a to lower coil 23b. Simultaneously, the plunger and carrier close contacts 67 and 68 thereby interconnecting both coil 23a and coil 23b with battery 70. As a polarizing current passes through the coil generating the magnetic field in a formation adjacent to the well bore, it should be noted that the pairs of contacts are insulated from each other at carrier 64 by means of insulating barrier 71. As timing switch 72 opens in response to timing motor 73 and cam 74 the plunger 63 is retracted from contacts 65–68 to a location whereby the carrier 64 is in contact with contact extensions 65a and 68a. In that position the lower coil 23b forms a closed loop with amplifier 75 and oscilloscope 76 whereby nuclear magnetic signals derived from formation fluids may be detected and recorded.

*Optimizing sonde velocity as a function of coil length*

The magnitude of the length of the coil extension 14a (FIGURE 5) above the receiving coil 15 can be varied over a wide range but preferably is equal in magnitude to the product $VT_o$, where V is the velocity of the ascending or descending sonde and $T_o$ is the polarizing time required to align the protons in the adjacent formation with the generated magnetic field. The above-mentioned values of coil length are based on the assumption of the conjunctive use of a receiving coil co-extensive with and bounded within the forward and rearward ends of the polarizing coil. (The designation of the terms "forward" and "rearward" is with respect to the movement of the sonde.) The length of the receiving coil is also variable. But, in order to reduce the total number of readings required and hence reduce the total logging time, a value is usually chosen from a preferred range whose limits vary from one-quarter of the length of the extension to a value equal to that of the extension.

However, within the permissible receiving coil length variations, there are values that produce undesirable results in the subsequent logging record. One such result is the generation of a discontinuous logging record over a given region of the formation even though the polarizing coil polarizes all protons of that region a full desirable polarizing time before detection.

In this application, the term "discontinuous logging record" signifies a record having adjacent segments representing similarly situated well depth intervals, for which no signal response was obtained during the logging operation.

Two conditions, not previously described, contribute to this result:

(1) Receiving coils whose lengths are less than the product $VT_o$, as defined above; and (2) Logging operations in which there is a requirement that the polarizing coil be cooled after detection.

Figure 13:
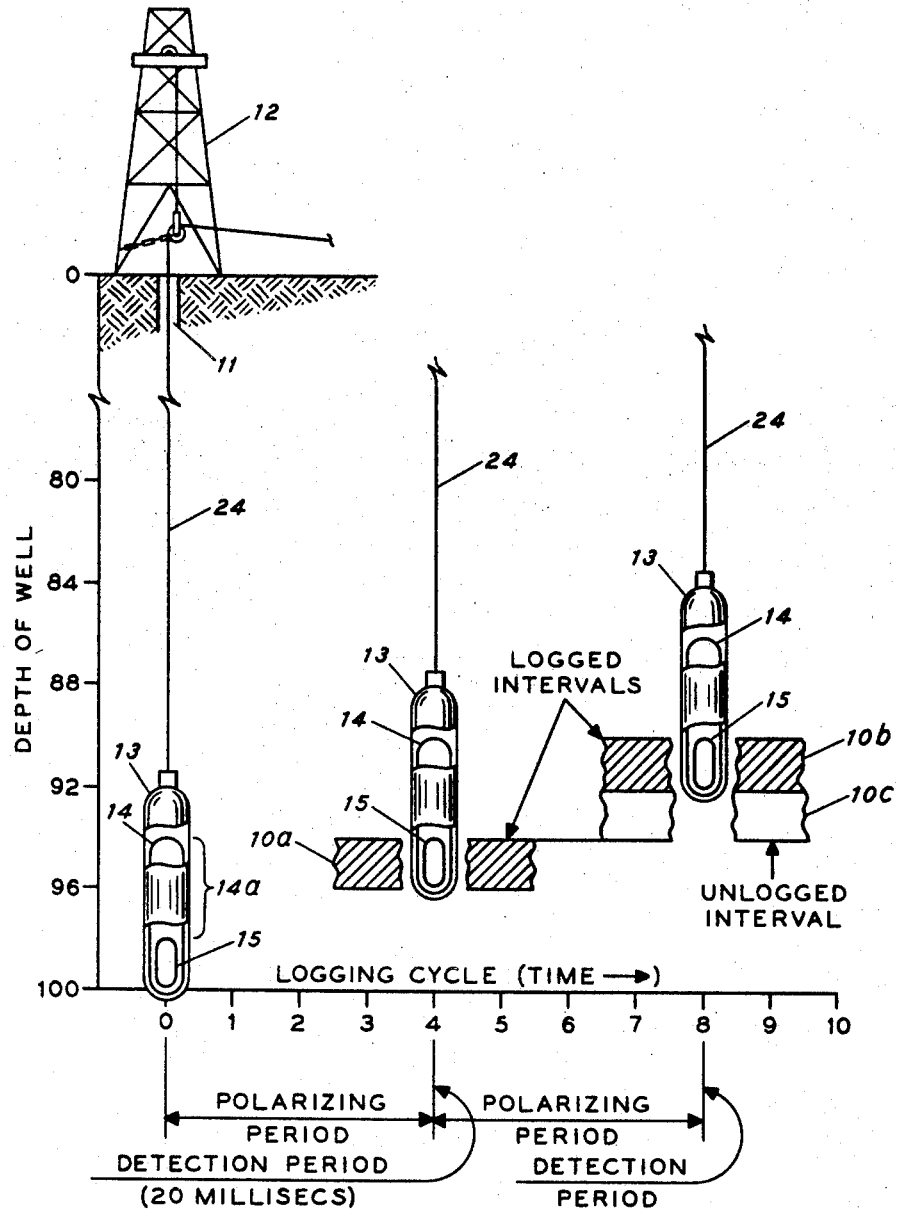

Referring now to FIGURE 13, there is shown a time-base plot of the relative positions of logging sonde 13 within a well during logging to illustrate the generation of a discontinuous log by the first-mentioned condition. Sonde 13, similar to the sonde of FIGURE 1, attaches to derrick 12 through cable 24 and contains a schematic representation of a polarizing coil 14 having an extension 14a in the direction of travel of the sonde whose length is equal to the product $VT_o$, as is in accord with the preferred form of the invention. A receiving coil 15 is also located within the sonde so that the resulting magnetic axes of both receiving coil 15 and polarizing coil 14 are parallel. The length of the receiving coil is of a value less than the product $VT_o$, say two feet.

In the operative sequence, the sonde is initially positioned with its trailing edge at the 100-foot level of the well; when actuated, it continuously ascends along well bore 11 at a relatively high rate, say one foot per second. Polarization of the adjacent earth formation begins immediately with upward travel of the sonde. The polarizing interval is four seconds. After initiation of upward movement of the sonde, current passing through the polarizing coil generates a magnetic field in the adjacent formation normal to the well bore axis of the polarizing interval, for four seconds. Thus, during the polarizing period of the logging cycle, the sonde ascends four feet, its position being as indicated in the figure as the polarizing cycle ends. After the polarizing current is terminated, the precessing protons of the fluids in the adjacent formation are detected by the receiving coil 15. The depth interval scanned by the receiving coil 15 is seen to be equal to the length of that coil and is so indicated by the cross-sectional region 10a in the figure. Signal response is maximum inasmuch as all the protons along the length of that interval have been polarized a full polarizing time prior to detection by the receiving coil. At the end of the detection cycle, say 20 milliseconds, the cycle is repeated, polarizing current again passing through the polarizing coil as the sonde continues to ascend followed by a detection cycle covering a different geological formation 10b above the previously logged interval. But, at the end of the second detection cycle, however, a given depth interval 10c is seen to be bypassed by the receiving coil without being scanned for precessing protons. Inasmuch as this effect is repeated along the entire length of the well bore, the resulting logging record represents a discontinuous series of unlogged depth intervals of the formation. The incomplete nature of the log is undesirable for most logging operations since the operator wishes to identify changes in the earth formation over the entire well interval traversed by the sonde.

Figure 14:
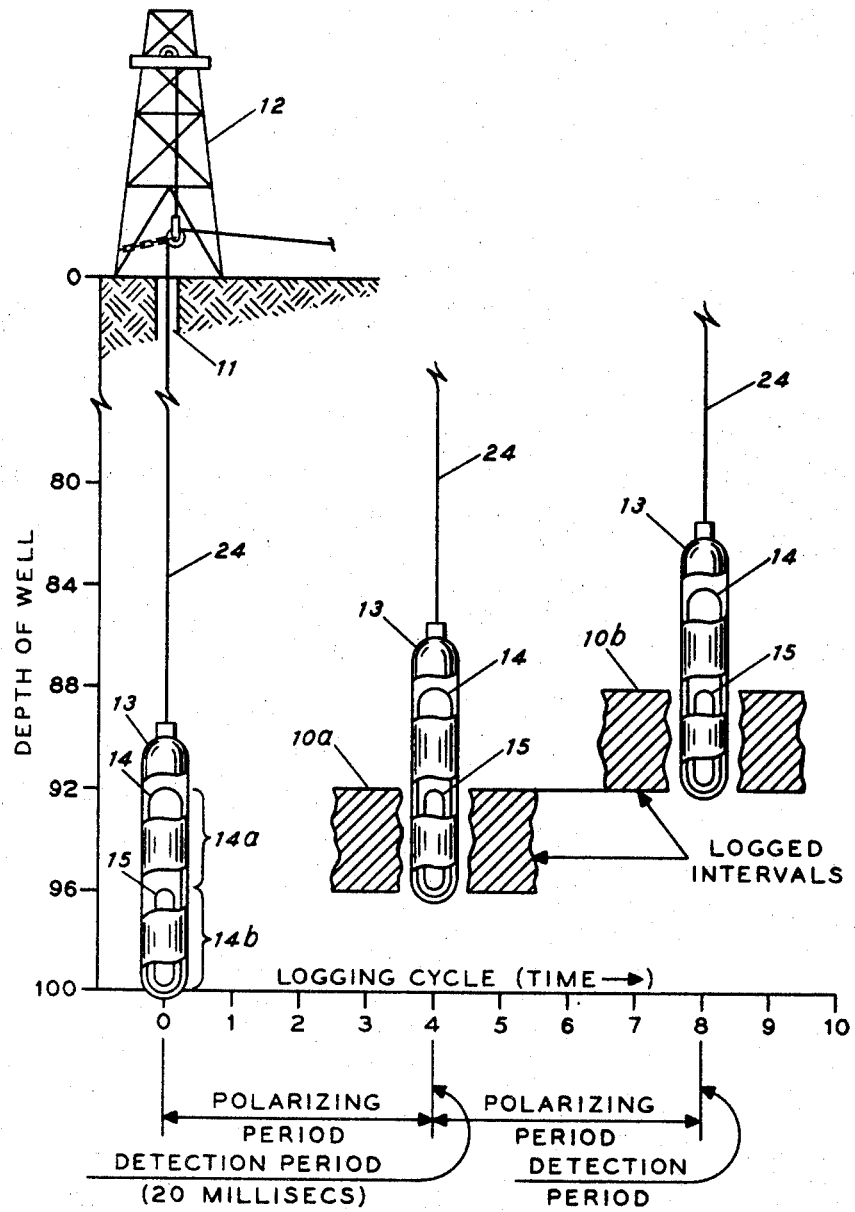

FIGURE 14 is a time-base plot of the relative position of a modified logging sonde 13 within a well wherein a continuous logging record of the well is obtained. As indicated, sonde 13 includes polarizing and receiving coils 14 and 15 modified as illustrated. Specifically, the rearward ends of these coils, as viewed, are extended so that the lengths of the receiving coil 15, lower extension 14b, and upper extension 14a are now of preferred lengths; i.e., each is equal to the product $VT_o$. A continuous log is thus generated by the logging tool, as can be seen in the figure where the cross-sectional regions 10a and 10b, indicating the interval of formation scanned for precessing protons by the modified receiving coil, are adjacently located. Subsequent intervals of the formation are similarly logged for the presence of protons so that the resulting logging record is continuous over the region traversed by the sonde. In alternate configurations, the receiving coil and the polarizing coil may be formed such that the length of extension 14a and the receiving coil 15 have values greater than preferred; although, to generate a continuous log, the length of the receiving coil 15 (and lower extension 14b) must always be at least equal to the product $VT_o$. If the length of the receiving coil is longer than the preferred value, the resulting log contains depth intervals that have been scanned for the presence of protons more than once. If the signals within these intervals have been correctly phased, the signals may be added in a manner well known in the art so that total signal response for a given region can be greatly increased without sacrificing speed or efficiency of the logging operation.

Figure 15:
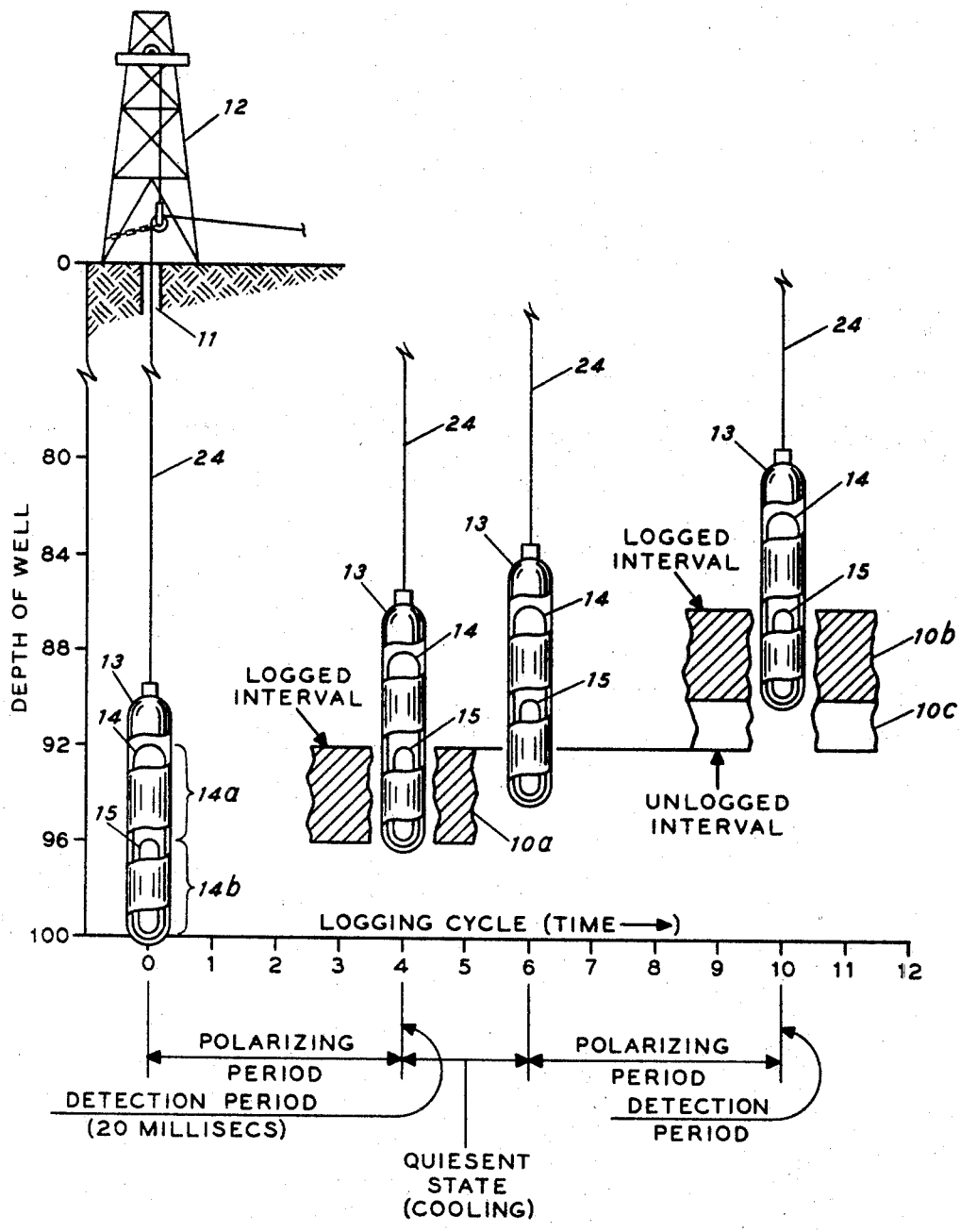

Referring now to FIGURE 15, there is illustrated a similar time-base plot of the relative positions of logging sonde 13 to illustrate the generations of a discontinuous log by the second-mentioned condition. For purposes of illustration, sonde 13 ascends through the well bore 11 at a constant velocity, say one foot per second, and includes a polarizing coil 14 having an upper portion 14a that is four feet long (the product $VT_o$), a lower extension 14b that is also four feet long, and a receiving coil 15 of equal length. A polarizing period of four seconds is assumed.

An examination of the operative sequence shows that a given depth interval 10c, between logged intervals 10a and 10b, is bypassed by the receiving coil because the logging cycle includes a period of time in which the polarizing coil must be held in a quiescent state to prevent overheating. Such overheating is caused by the relatively high current passing through the coil necessary to generate the required magnetic field in the formation during the polarizing interval, although high bore hole temperatures may also contribute to the condition. The duration of the quiescent or cooling period will vary with logging applications but is usually longer than the detection period. If the duration of the cooling period is $T_q$, the magnitude of the depth interval bypassed each detection cycle is thus equal to the product $T_q V$, where $T_q$ is the quiescent period and $V$ is the velocity of the sonde.

Figure 16:
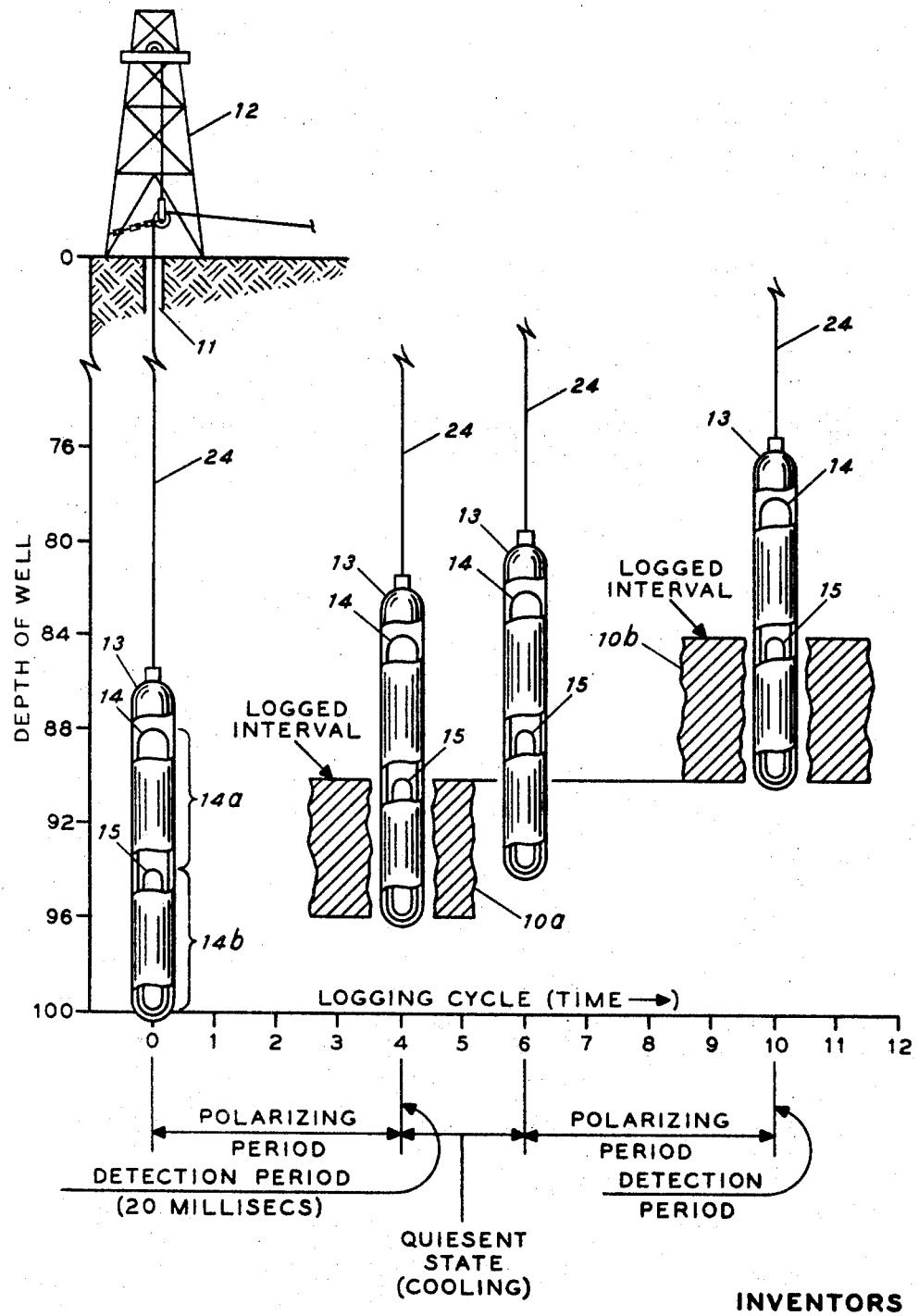

FIGURE 16 is a time-base plot of the relative position of a modified logging sonde 13 wherein a continuous log of the well is obtained, although the logging cycle includes a quiescent interval. As indicated, sonde 13 includes upper extension 14a, lower extension 14b, and the receiving coil 15 modified as shown. Specifically, the length of each is increased by the amount equal to the product $VT_q$ so that the resulting lengths of the extensions 14a and 14b of the polarizing coil, as well as that of receiving coil 15, now are equal to the product $V(T_o+T_q)$, as previously defined. In that manner, all adjacent depth intervals, such as 10a and 10b of the well as illustrated, are scanned for the presence of hydrogen atoms. Variations in coil lengths under quiescent operating conditions may also occur without departure from the scope of the present invention. For example, the lengths of upper extension 14a and receiving coil 15 may be greater than the preferred value although the receiving coil must always be at least equal to the product $V(T_o+T_q)$, as defined above to assure that the resulting logging record is continuous. Under such conditions, the logging record will contain signals from depth intervals scanned more than once. Assuming correct phasing of the signals can be achieved, the composite signal strength of a given region can thus be easily and quickly increased by subsequent processing without affecting the logging operation.

Various modifications and changes in both the method and apparatus for applying the present invention to nuclear magnetism well logging will occur to those skilled in the art, and such modifications and changes falling within the scope of the appended claims are intended to be included therein.

We claim:

1. Apparatus for increasing the speed with which nuclear magnetic signals can be generated and detected in an earth formation penetrated by a well bore and traversed by a logging sonde by aligning protons of said formation in a first direction by means of a polarizing field, interrupting said polarizing field and, as said protons precess about the earth's magnetic field, detecting said relaxing protons comprising means for traversing said sonde through said borehole at a velocity (V), said sonde including at least a pair of coils having magnetic axes, one of said coils having at least an effective portion of its windings extending along said well bore substantially farther than a second of said coils, said extension along said well bore axis being in the direction in which said sonde is moved during the logging operation and having a magnitude related to the velocity (V) of the sonde and the polarizing time ($T_o$) of said earth formation, a polarizing current source, means for connecting at least said one coil to said current source to serve as a polarizing coil of known effective length to provide a magnetic field in said earth formation for a time period at least equal to the polarizing time ($T_o$) of said formation, means for interrupting said polarizing current, amplifier means, means for connecting said second coil to said amplifier means at least during the interval of time following the interruption of said polarizing current, so that said nuclear magnetic precession signals may be detected by said second coil, said detected signals coming from fluids containing protons precessing about and relaxing towards the earth's magnetic field in portions of said earth formation that have previously been traversed and previously polarized at least in part by the magnetic field generated by polarizing current flowing through said extension of said one coil, said pair of coils being connectable in series so that said polarizing current will flow through both of said coils during polarization of the formation and disconnectable following interruptions of said polarizing current so that said second coil is permitted to be singly connectable to said amplifier means.

2. In an apparatus for logging an earth formation penetrated by a well bore for identifying the presence of hydrocarbons by generation and detection of nuclear magnetism signals from protons in said hydrocarbons by aligning said protons of said hydrocarbons in a first direction by means of a polarizing field, interrupting said polarizing field and, as said protons precess about the earth's magnetic field, detecting said relaxing protons wherein a logging sonde traverses said well bore at a constant velocity (V), the improvement comprising first and second coils housed within said sonde and means for selectively connecting a current source and an amplifying means to said coils, said coils including windings defining turns of substantially rectangular configurations disposed within said sonde with the long side substantially parallel to the axis of symmetry of said logging sonde, said first coil having a portion thereof extending beyond said second coil in the direction of travel of said sonde, the length of said extended portion of said first coil in said direction parallel to movement of said sonde being at least equal to $VT_o$, where V is the velocity of the traversing sonde and $T_o$ is the polarizing time of said protons of said hydrocarbons in said formation, to generate a magnetic field in the earth formation for a time period at least equal to the polarizing time ($T_o$) of said formation and thereby substantially prepolarize protons of said hydrocarbons in said formation before arrival of said second coil.

3. In an apparatus for logging an earth formation penetrated by a well bore for identifying the presence of hydrocarbons by generation and detection of nuclear magnetism signals from protons in said hydrocarbons by aligning said protons of said hydrocarbons in a first direction by means of a polarizing field, interrupting said polarizing field and, as said protons precess about the earth's magnetic field, detecting said relaxing protons wherein a logging sonde traverses said well bore at a constant velocity (V), the improvement comprising first and second coils housed within said sonde and means for selectively connecting a current source and an amplifying means to said coils, said coils including windings defining turns of substantially rectangular configuration disposed within said sonde with the long side substantially parallel to the axis of symmetry of said logging sonde, said first coil having a portion thereof extending beyond said second coil in the direction of travel of said sonde, said extending portion having a magnitude related to the velocity (V) of the traversing sonde, and the polarizing time ($T_o$) of said earth formation to generate a magnetic field in the earth formation for a time period at least equal to the polarizing time ($T_o$) of said formation and thereby substantially prepolarize protons of said hydrocarbons in said formation before arrival of said second coil, said first and second coils being connectable in series so that said polarizing current will flow through both of said coils during polarization of said formation and disconnectable following interruptions of said polarizing current so that said second coil is permitted to be singly connected to said amplifier means.

4. The method of improving the reliability and accuracy of nuclear magnetic logging which comprises the steps of employing a pair of coils for generating and detecting nuclear magnetic precession signals of protons of an earth formation penetrated by a well bore, by aligning said protons of said earth formation in a first direction by means of a polarizing field, interrupting said polarizing field and, as said protons precess about the earth's magnetic field, detecting said relaxing protons, one of said coils having at least an effective portion of its windings extending substantially farther than a second of said coils, positioning said coils in said well bore with said extension disposed in the direction in which said coils will move during the logging operation, traversing said coils through said well bore at a velocity of traverse not greater than the quotient of $L/T_o$ where L is the length of said extension of said one coil and $T_o$ is the polarizing time of the protons of said earth formation, and applying a polarizing current to at least said one coil for said predetermined polarizing time ($T_o$) to generate a magnetic field for over an extended region of said earth formation for a continuous time period so that all protons within a portion of said extended region are polarized at least said full polarizing time ($T_o$), interrupting said polarizing current and then positioning said second coil adjacent to said portion of said extended region to detect the inphase precession of protons in said formation as said protons relax towards the earth's magnetic field.

5. Method of improving reliability and accuracy in nuclear magnetic logging of an earth formation penetrated by a well bore which comprises the steps of positioning at least a pair of coils in said well bore for generating and detecting nuclear magnetic precession signals of protons of said earth formation by aligning said protons of said earth formation in a first direction by means of a polarizing field, interrupting said polarizing field and, as said protons precess about the earth's magnetic field, detecting said relaxing protons, one of said coils having an effective portion of its windings extending substantially farther than second of said coils in the direction in which said coils move during the logging operation, continuously traversing said coils through said well bore at a constant velocity not greater than the quotient of the length (L) of said extension divided by the polarizing time ($T_o$) of said protons, cyclically applying a polarizing current to at least said one coil to generate a magnetic field over a series of extended areas of said earth formation for a continuous time period equal to at least the polarizing time ($T_o$) of said protons, positioning said second coil adjacent to successive portions of said extended areas after said polarizing current is interrupted to detect the in-phase precession of protons in said formation as said protons precess about the earth's magnetic field, the cycling period for said polarizing current being at least the sum of the time required to polarize said protons and the time required to detect the in-phase precession thereof.

6. The method of improving the reliability and accuracy in nuclear magnetic logging to obtain a continuous record of an earth formation penetrated by a well bore which comprises the steps of positioning at least a pair of coils in said well bore for generating and detecting nuclear magnetic precession signals of protons of an earth formation by aligning said protons of said earth formation in a first direction by means of a polarizing field, interrupting said polarizing field and, as said protons precess about the earth's magnetic field, detecting said relaxing protons, one of said coils having a first effective portion ($L_1$) of its windings extending substantially farther than a second of said coils in the direction in which said coils move during the logging operation, and a second portion ($L_2$) coextensive with said other coil, continuously traversing said coils through said well bore at a constant velocity (V), whose magnitude is at least within the limits defined by the ratios $L_1/T_o$ and $L_2/T_o$ where $T_o$ is the polarizing time of said earth formation, cyclically applying a polarizing current to said one coil to generate a magnetic field over a series of extended areas of said earth formation, positioning said other coil adjacent to successive portions of said extended areas after said polarizing current is interrupted to detect the inphase precession of protons in said formation as said protons relax towards the earth's magnetic field, the cycling period for said polarizing current being at least the sum of the time required to polarize said protons and the time required for detection of the inphase precession of said protons where said time required for detection is much less than the time required to polarize said protons, and thereafter recording said signals.

7. The method in accordance with claim 6 in which the cycling period for said polarizing current includes a time interval to allow said one coil to cool and in which the magnitude of the velocity (V) of traverse of said sonde is at least within the limits defined by the ratios $L_1/T_o+T_q$ and $L_2/T_o+T_q$ where $T_q$ is said cooling time interval.

8. Apparatus for logging depth intervals of an earth formation penetrated by a well bore and identifying the presence of hydrocarbons therein by generating and detecting nuclear magnetism signals from protons of said hydrocarbons, wherein a logging sonde traverses said well bore and is selectively connected to a polarizing coil source and amplifying means to provide a continuous record of nuclear magnetism signals along the entire length of said well bore, the improvement comprising at least first and second coils housed within said sonde and means for selectively connecting said current source and said amplifying means to said coils, said coils including windings defining turns of substantially rectangular configuration disposed within said sonde, said longer sides of each turn being substantially parallel to the axis of travel of said sonde, said first coil having an effective portion of its windings extending beyond said second coil in said direction of travel to generate a magnetic field in said earth formation and thereby substantially polarize portions of said hydrocarbons before arrival of said second coil, the length of said extension and the length of said second coil, measured in said direction of travel of said sonde, being equal to each other and each having a magnitude of at least equal to the product $V(T_o+T_q)$, where V is the velocity of traverse of said sonde, $T_o$ is the polarizing time of said protons of said hydrocarbons, and $T_q$ is the quiescent time interval necessary to allow said polarizing coil to cool between generation and detection of said nuclear magnetism signals.

References Cited

UNITED STATES PATENTS

| | | | |
|---|---|---|---|
| 3,004,212 | 10/1961 | Coolidge et al. | 324—0.5 |
| 3,128,425 | 4/1964 | Codrington | 324—0.5 |
| 3,135,912 | 6/1964 | Baker et al. | 324—0.5 |
| 3,213,354 | 10/1965 | Baker | 324—0.5 |
| 3,268,800 | 8/1966 | Hoehn | 324—0.5 |
| 3,250,986 | 5/1966 | McKay | 324—0.5 |

RUDOLPH V. ROLINEC, *Primary Examiner.*

M. J. LYNCH, *Assistant Examiner.*